United States Patent [19]

Rüd et al.

[11] Patent Number: 4,999,994
[45] Date of Patent: Mar. 19, 1991

[54] TURBO ENGINE

[75] Inventors: Klaus Rüd, Gröbenzell; Alois Rohra, München, both of Fed. Rep. of Germany

[73] Assignee: MTU Motoren- und Turbinen-Union Munchen GmbH, Fed. Rep. of Germany

[21] Appl. No.: 398,445

[22] Filed: Aug. 25, 1989

[30] Foreign Application Priority Data

Aug. 25, 1988 [DE] Fed. Rep. of Germany ....... 3828834

[51] Int. Cl.$^5$ .............................................. F02C 7/06
[52] U.S. Cl. ................................ 60/39.08; 416/170 R; 416/174
[58] Field of Search ........................... 60/39.08, 39.093; 184/6.11, 6.22; 416/170 R, 174

[56] References Cited

U.S. PATENT DOCUMENTS 4,722,666 2/1988 Dennison et al. .................. 416/174
4,887,424 12/1989 Geidel et al. ....................... 60/39.08

FOREIGN PATENT DOCUMENTS 750200 6/1956 United Kingdom ............... 60/39.08

Primary Examiner—Louis J. Casaregola
Attorney, Agent, or Firm—Evenson, Wands, Edwards, Lenahan & McKeown

[57] ABSTRACT

A turbo engine with a gas turbine to drive propellers or propfan blades is disclosed which includes a speed reduction transmission interposed behind the gas turbine output drive shaft and the propellers or propfan blades. A cooling air impeller is provided to provide the supply of cooling air to an oil cooler for the speed reduction transmission. The impeller is arranged directly on the turbine output drive shaft.

11 Claims, 3 Drawing Sheets

TURBO ENGINE

BACKGROUND AND SUMMARY OF THE INVENTION

This invention relates to a turbo engine having a gas turbine to drive propeller or propfan rotors through a gear speed decreaser or speed reduction transmission, where the speed reduction transmission exhibits a separate lubricating oil system comprising an oil cooler, oil pump and oil tank.

A turbo engine of this generic description has been disclosed in, e.g., German Published Examined Patent Application (DE-OS) 37 14 990, where a suitable gearbox oil cooling system is arranged as a compact unit to dissipate the considerable heat loss of the speed reduction transmission. In this arrangement the operability of the cooling system largely depends on a reliable supply of cooling air to the oil cooler to suit all operating conditions of the engine. This design exhibits one special disadvantage; at idle speed or ground operations the energy conversion and the attendant heat generation already reaches a considerable level, while energization of the oil cooler with cooling air is still inadequate.

A broad object of the invention is therefore to provide an arrangement of the above noted type wherein the cooling air supply system provides adequate and reliable oil cooler ventilation at all operating points of the engine this object is achieved according to preferred embodiments of the invention by providing an oil cooler impeller connected to the gas turbine output shaft and disposed to act on the cooling air for the oil cooler. This arrangement provides an advantage in that the supply of cooling air flow to the oil cooler is assisted by means of an additional cooling air impeller, where the delivery capacity essentially varies with the speed of the drive shaft and the outer diameter of the impeller wheel. This arrangement provides—at no more than moderate pressurization—a sufficient supply of cooling air to the cooling air duct inlet also under extreme operating conditions, which typically occur during reverse thrust application upon touchdown of the aircraft, especially when thrust reversal is effected by fan blade variation.

This arrangement also enables the oil cooler to be advantageously designed for higher cooling air pressure losses, and hence to be made smaller and lighter in weight. It simultaneously permits the cooling air requirement to be reduced and adverse effects on the engine cycle to be reduced accordingly.

The number and size of the struts to duct the cooling air in the compressor inlet section can be reduced, because the allowable pressure losses are greater, which makes for a cleaner gas turbine inlet. Another benefit is that the flow areas in the cooling air duct can be reduced, again on account of the higher allowable Pressure losses, leaving more available mounting space in the hub housing.

Since the oil cooler impeller arrangement in especially preferred embodiments of the invention connects directly to the shaft, omitting intermediate gearing, a compact and relatively simple construction for integrating the impeller stage is provided. The absence of intermediate gearing additionally makes for extreme ease of maintenance of the oil cooler impeller.

Owing to the relatively low thermal and mechanical loads the oil cooler impeller can be manufactured as a light-weight construction using light weight, low alloy materials (e.g. aluminum alloys). The weight penalty associated with a centrifugal impeller is thus minimized, as are the resultant inertia forces impairing the dynamic response of the propfan stages.

In a further advantageous aspect of certain preferred embodiments of the present invention, the cooling air duct exhibits a U-shape when viewed in an axial plane, where it extends radially inward from intake holes on the outer circumference of the hub, where the impeller is arranged in the curved region, and where the duct thereafter extends radially outward. This makes for a compact and low-drag arrangement.

In a further advantageous aspect of certain preferred embodiments of the present invention, the impeller is the centrifugal type to give a high pressure difference at maximum compactness.

In a further preferred aspect of preferred embodiments of the present invention, the cooling air duct issues into an outer casing chamber through hollow structs of the gas turbine inlet duct. This prevents the hot air from influencing the gas turbine parameters (raising the high-pressure compressor inlet temperature). In an alternative embodiment the cooling air duct communicates with the gas turbine inlet duct through a number of hollow struts open at the trailing edge. Although this involves some influence on the gas turbine parameters, the pressure rise generated by the fan stage can here be used for propulsion, and the tapped cooling air can gainfully be reinjected into the engine cycle.

In certain preferred embodiments, the intake holes Preferably taken the shape of grid screens that have the form of cylindrical sections and are spaced over the circumference of the hub. This makes for a low-drag outer contour of the hub in the region upstream of the gas turbine inlet duct. Within the grid screens, a second, concentrically disposed row of grid screens is preferably arranged, where the inner row of screens can be offset to vary the flow area of the duct. This provides a simple means for controlling the cooling air flow. Simultaneously this arrangement prevents unfavorable repercussions on the core engine inlet flow at off-design, when the cooling air take-off is reduced.

In an alternative embodiment of the present invention the intake holes are arranged in the interior of the gas turbine inlet duct, the impeller is arranged upstream of the oil cooler, and the coolant flow duct connects to deicing lines downstream of the oil cooler. In this manner the cooling air heated in the oil cooler can be used for deicing the hub, the spinner, and/or the propfan blade sections near the hub. The cooling air duct preferably connects to deicing ducts which extend to the nose area underneath an outer skin and have regularly spaced outlet holes. The escaping cooling air can thus prevent icing of the hub section. The cooling air duct alternatively or additionally connects to deicing ducts on the propfan blade leading edges for further deicing duty.

In a further advantageous aspect of the present invention the oil cooler impeller is disconnectably connected to the shaft, so that the ventilation effort of the impeller can be omitted in the presence of sufficient ram pressure, as in the inflight condition.

Alternatively a shut-off flap can be inserted into the cooling air duct for control of the cooling air flow, or of the impeller ventilation effort.

Other objects, advantages and novel features of the present invention will become apparent from the fol-

DETAILED DESCRIPTION OF THE DRAWINGS

Figure 1:
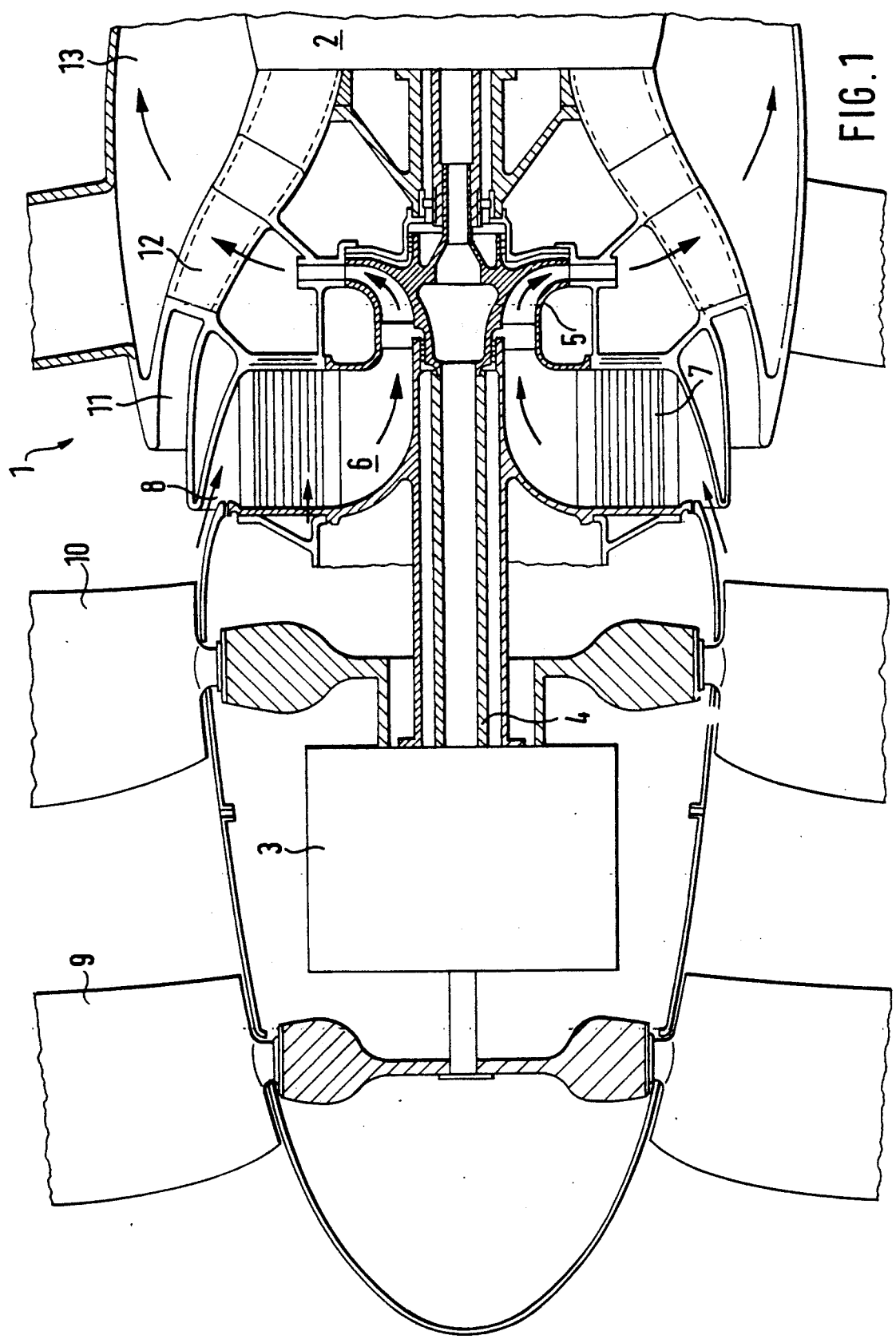
FIG. 1 is schematic partial elevation view illustrating the forward area of a propfan turbo engine; constructed according to a preferred embodiment of the invention.

With reference now to FIG. 1 a turbine engine 1 essentially comprises two rows of circumferentially spaced propfan blades 9, 10 connected to a speed reduction transmission in a counter-rotating arrangement. The speed reduction transmission 3 connects through a shaft 4 to a gas turbine 2, which is omitted on the drawing, to drive the propfan blades 9 and 10. The gas turbine 2 is supplied with fresh air through the gas turbine inlet duct 11. Provided between the rear row of Propfan blades 10 and the gas turbine inlet duct 11 are circumferentially spaced intake holes 8 of the cooling air duct 6 to route cooling air to the oil cooler 7. Downstream of the oil cooler 7 an impeller 5 is provided on the shaft 4 to route the cooling air flow to an outer casing chamber 13 through a number of hollow struts 12.

Figure 2:
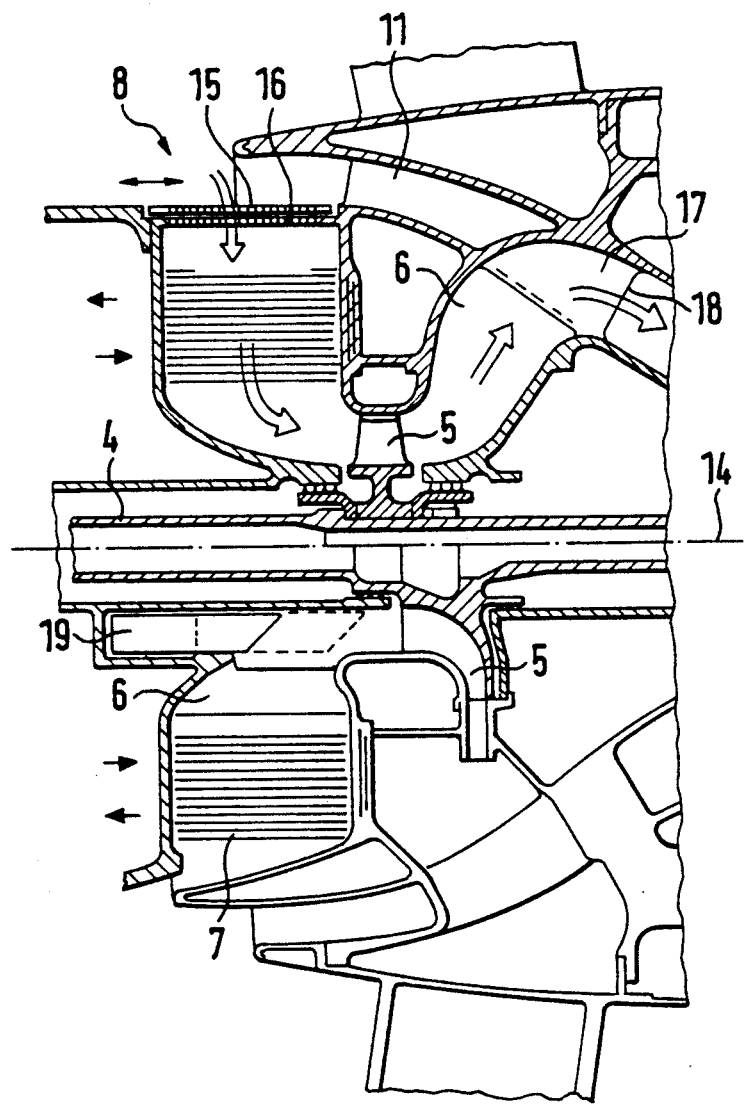
FIG. 2 is a schematic partial selective elevation view of a propfan turbo engine illustrating two preferred embodiments of the present invention.

Shown in FIG. 2 are two alternative embodiments. In the arrangement shown above the centerline 14 the impeller 5 is a single-stage axial-flow design arranged on the shaft 4. The intake holes 8 are grid screens 15 taking the form of cylindrical sections. Arranged within these screens is a second, concentrically arranged row of grid screens 16, so that the flow area of the duct can be varied by axially or circumferentially offsetting one or the other of the rows of screens. The cooling air duct 6 issues into a number of hollow struts 17, the trailing edges 18 of which are left open, so that the cooling air from the cooling air duct 6 can be admixed to the fresh intake air in the gas turbine inlet duct 11.

The arrangement illustrated below the centerline 14 in FIG. 2 shows the impeller 5 as a centrifugal type, where a shut-off flap 19 can be inserted into the flow duct 6 at a point between the oil cooler 7 and the impeller 5 to vary the cooling air flow rate.

Figure 3:
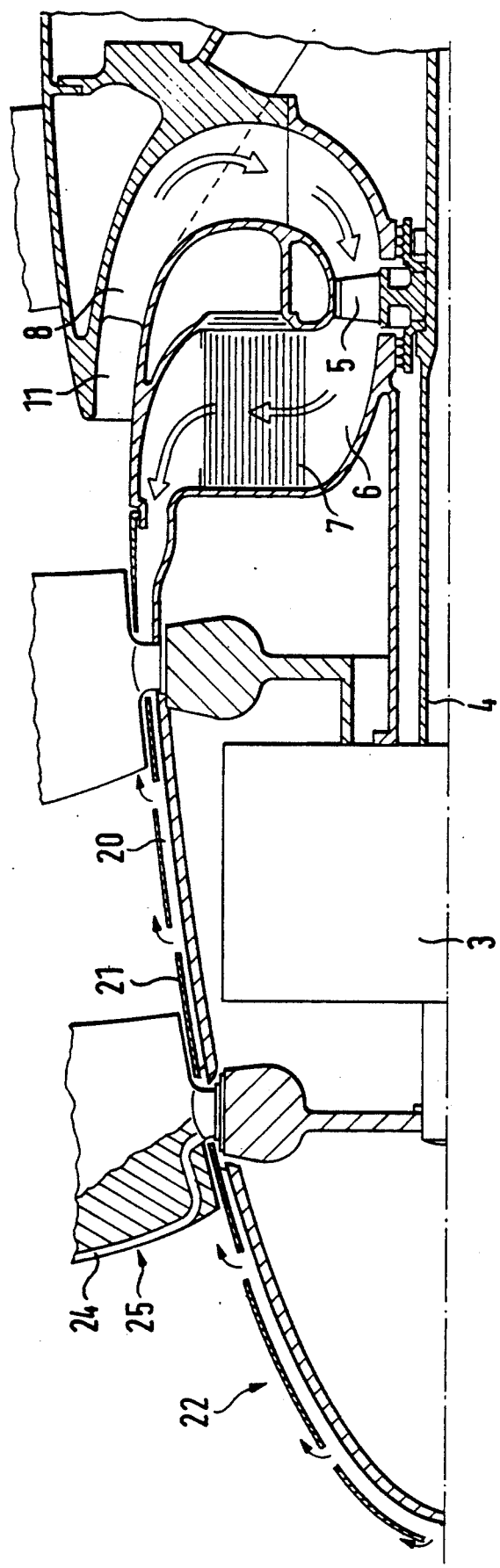
FIG. 3 is a schematic partial selective elevation view illustrating an alternative embodiment of the present invention.

The embodiment illustrated in FIG. 3 has intake holes 8, which in the gas turbine inlet duct 11, deviate a portion of the intake air and route it to the impeller 5. Downstream of the impeller 5 the air cooler 7 is provided in the flow duct 6, and downstream of the oil cooler 7 the cooling air duct 6 connects to deicing lines 20. These extend forward—underneath the outer skin 21—to the hub region 22 of the propfan turbo engine 1, where regularly spaced outlet holes 23 permit a portion of the coolant flow to escape to the outside. The cooling air duct 6 can alternatively or additionally be connected also to deicing ducts 24 on the propfan blade leading edges 25.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Turbo engine arrangement, comprising:
   gas turbine means, having an air intake duct, drivingly acting on a gas turbine output shaft;
   propeller means;
   speed reduction transmission means spaced axially from said gas turbine means drivingly interconnecting the gas turbine output shaft and the propeller means;
   transmission lubricating system means including an oil cooler having an annular configuration arranged axially between said speed reduction means and said gas turbine means and mounted radially inward of said air intake duct, said transmission lubricating system means being subjected to oil cooler cooling air flow;
   an oil cooler cooling air duct annularly arranged about said gas turbine output shaft including, a first section beginning in front of said air intake duct and extending radially inward having mounted therein said oil cooler; a second section extending in an axially aligned direction along the outer circumference of said gas turbine output shaft; a third section located downstream of said second section extending radially outward;
   a gas turbine engine outer casing chamber wherein the oil cooler cooling air duct discharges into said outer casing chamber through hollow struts of said air intake duct and wherein said oil cooler cooling air duct cross section steadily decreases from its inlet to its outlet; and
   an oil cooler impeller means arranged in said oil cooler cooling air duct downstream of said oil cooler.

2. Turbo engine arrangement according to claim 1, wherein the oil cooler impeller means is a centrifugal type impeller.

3. Turbo engine arrangement according to claim 1, wherein the oil cooler impeller means is single-stage axial-flow impeller.

4. Turbo engine arrangement according to claim 1, wherein the oil cooler cooling air duct communicates with a gas turbine inlet duct through a number of hollow struts which are left open at the trailing edge.

5. Turbo engine arrangement according to claim 1, wherein said first section includes intake holes which take the shape of grid screens that take the form of cylindrical sections spaced over the circumference of a hub for the propeller means.

6. Turbo engine arrangement of claim 5, wherein, within the grid screens, a second, concentrically arranged row of grid screens is arranged, where the throat area of the oil cooler cooling air duct can be varied by offsetting one or the other of the rows of grid screens.

7. Turbo engine arrangement according to claim 1, wherein the oil cooler impeller means includes means for selectively disconnectably coupling the oil cooler impeller means to the shaft.

8. Turbo engine arrangement according to claim 1, wherein a shut-off flap is provided for inserting into the oil cooler cooling air duct.

9. Turbo engine arrangement according to claim 1, wherein the propeller means includes two rows of circumferencely spaced counter-rotating propfan blades.

10. Turbo engine arrangement according to claim 1, wherein the oil cooler impeller means is connected directly to the gas turbine output shaft.

11. Turbo engine arrangement according to claim 1, wherein said impeller means is operatively coupled on the gas turbine output shaft.

* * * * *